(12) United States Patent
Terada

(10) Patent No.: US 10,178,278 B2
(45) Date of Patent: Jan. 8, 2019

(54) IMAGE FORMING APPARATUS THAT APPLIES CORRECTION SELECTIVELY TO A SUBSET OF PIXELS

(71) Applicants: KABUSHIKI KAISHA TOSHIBA, Tokyo (JP); TOSHIBA TEC KABUSHIKI KAISHA, Tokyo (JP)

(72) Inventor: Takafumi Terada, Sunto Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 6 days.

(21) Appl. No.: 15/641,954

(22) Filed: Jul. 5, 2017

(65) Prior Publication Data

US 2018/0205853 A1 Jul. 19, 2018

(30) Foreign Application Priority Data

Jan. 19, 2017 (JP) ................. 2017-007625

(51) Int. Cl.
*H04N 1/58* (2006.01)
*H04N 1/405* (2006.01)
*H04N 1/60* (2006.01)

(52) U.S. Cl.
CPC ............. *H04N 1/58* (2013.01); *H04N 1/405* (2013.01); *H04N 1/6072* (2013.01); *H04N 2201/0094* (2013.01)

(58) Field of Classification Search
CPC ............ H04N 1/58; H04N 1/62; H04N 1/405; H04N 1/6072; H04N 2201/0094
See application file for complete search history.

(56) References Cited

U.S. PATENT DOCUMENTS 7,983,507 B2 7/2011 Kouzaki et al.

FOREIGN PATENT DOCUMENTS

JP 2007129448 A 5/2007

*Primary Examiner* — Christopher D Wait
(74) *Attorney, Agent, or Firm* — Patterson & Sheridan, LLP

(57) ABSTRACT

An image forming apparatus includes a printing device, a storage device, in which unevenness correction data indicating a corrected pixel value in association with each input pixel value are stored, and a processor. The processor is configured to determine, among pixels indicated by raster image data of an image to be printed, edge pixels corresponding to an edge image portion and non-edge pixels corresponding to a non-edge image portion, carry out unevenness correction on the raster image data selectively with respect to the determined non-edge pixels, using the unevenness correction data stored in the storage device, generate print image data based on the raster image data subjected to the unevenness correction, and control the printing device to print the image based on the generated print image data.

20 Claims, 14 Drawing Sheets

FIG. 4

| REGION 1 | | REGION 2 | | REGION 3 | | REGION 4 | |
|---|---|---|---|---|---|---|---|
| INPUT VALUE | OUTPUT VALUE | INPUT VALUE | OUTPUT VALUE | INPUT VALUE | OUTPUT VALUE | INPUT VALUE | OUTPUT VALUE |
| 0 | 0 | 0 | 0 | 0 | 0 | 0 | 0 |
| 1 | 1 | 1 | 1 | 1 | 1 | 1 | 1 |
| 2 | 1 | 2 | 2 | 2 | 2 | 2 | 2 |
| 3 | 2 | 3 | 2 | 3 | 3 | 3 | 3 |
| ... | ... | ... | ... | ... | ... | ... | ... |
| 253 | 238 | 253 | 243 | 253 | 248 | 253 | 253 |
| 254 | 239 | 254 | 244 | 254 | 249 | 254 | 254 |
| 255 | 240 | 255 | 245 | 255 | 250 | 255 | 255 |

IMAGE FORMING APPARATUS THAT APPLIES CORRECTION SELECTIVELY TO A SUBSET OF PIXELS

This application is based upon and claims the benefit of priority from Japanese Patent Application No. 2017-007625, filed Jan. 19, 2017, the entire contents of which are incorporated herein by reference.

FIELD

Embodiments described herein relate generally to an image forming apparatus, an image processing device, and an image processing method.

BACKGROUND

When printing an image using electrophotography, even though image data indicate same color and same density for pixels of an entire sheet, a density of a coloring material formed on a sheet may become uneven. In order to correct the unevenness, an unevenness correction of one type can be carried out to modify the image data in accordance with a coordinate value of pixels in a main scan direction. When the unevenness correction is carried out, edges of characters printed on the sheet may include jaggies because a screen pattern may lie over a region of the characters due to the unevenness correction. In view of this issue, a method provides a technique of selectively carrying out unevenness correction depending on the type (image/graphics/text) of an object to be printed. It is also desirable to further precisely carry out the unevenness correction with respect to each of the object, to improve image quality.

DESCRIPTION OF THE DRAWINGS

FIG. 4 illustrates an example of an unevenness correction table according to the embodiment.

FIG. 9 illustrates an example of an input image prior to the unevenness correction processing.

FIG. 10 illustrates an example of an image resulting after the unevenness correction processing of the related art.

FIG. 11 illustrates an example of an image resulting after halftone processing of the related art.

FIG. 14 illustrates an example of an image resulting after the halftone processing according to the embodiment.

DETAILED DESCRIPTION

An embodiment provides an image processing device and an image processing method which can prevent image degradation due to unevenness of print density.

In general, according to an embodiment, an image forming apparatus includes a printing device, a storage device, in which unevenness correction data indicating a corrected pixel value in association with each input pixel value are stored, and a processor. The processor is configured to determine, among pixels indicated by raster image data of an image to be printed, edge pixels corresponding to an edge image portion and non-edge pixels corresponding to a non-edge image portion, carry out unevenness correction on the raster image data selectively with respect to the determined non-edge pixels, using the unevenness correction data stored in the storage device, generate print image data based on the raster image data subjected to the unevenness correction, and control the printing device to print the image based on the generated print image data.

Hereinafter, an image processing device and an image processing method according to an embodiment will be described with reference to the drawings.

Figure 1:
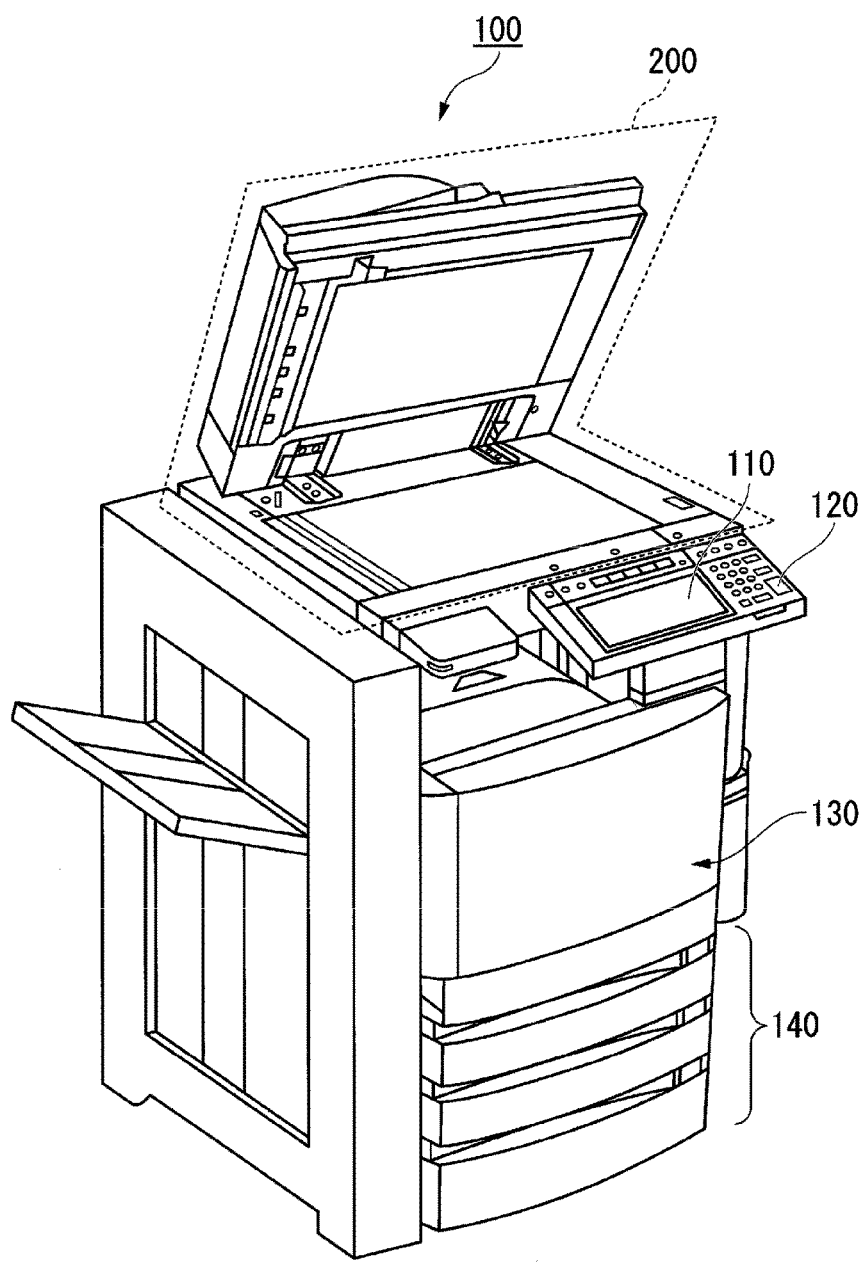
FIG. 1 is an external view of an image processing device according to an embodiment.

FIG. 1 is an external view of an image processing device 100 according to an embodiment. The image processing device 100 is an image forming device such as a multi-function peripheral (MFP). The image processing device 100 includes a display 110, a control panel 120, a printer unit 130, a sheet containing unit 140, and an image reading unit 200. The printer unit 130 of the image processing device 100 may be a device which fixes a toner image, and may be a device of an ink jet type.

The image processing device 100 generates digital data by reading an image illustrated on a sheet, and generates an image file. The sheet is, for example, a document, paper on which a character, an image, or the like is described, or the like. The sheet may be any type of material as long as the material can be read by the image processing device 100.

The display 110 is an image display device, such as a liquid crystal display or an organic electro luminescence (EL) display. The display 110 displays various types of information on the image processing device 100.

The control panel 120 has a plurality of buttons. The control panel 120 receives operation data of a user. The control panel 120 outputs a signal according to the operation which is performed by the user to a control unit of the image processing device 100. The display 110 and the control panel 120 may be configured as one touch panel.

The printer unit 130 forms an image on the sheet, based on image information which is generated by the image reading unit 200 or image information which is received through a communication path. The printer unit 130 forms an image according to, for example, the following processing. An image forming unit of the printer unit 130 forms an electrostatic latent image on a photosensitive drum, based on the image information. The image forming unit of the printer unit 130 forms a visible image by depositing developing agency on the electrostatic latent image. The toner is a specific example of the developing agency. A transfer unit of the printer unit 130 transfers a visible image onto the sheet. A fixing unit of the printer unit 130 fixes the visible image on the sheet by heating or pressing the sheet. The sheet on which an image is formed may be a sheet which is contained in the sheet containing unit 140, and may be a sheet pointed by a hand.

The sheet containing unit 140 contains sheets which are used for image formation of the printer unit 130.

The image reading unit 200 reads image information of a read target by using brightness and darkness of light. The image reading unit 200 stores the read image information. The read image information may be transmitted to other information processing devices through a network. The reads image information may form an image on the sheet by using the printer unit 130.

Figure 2:
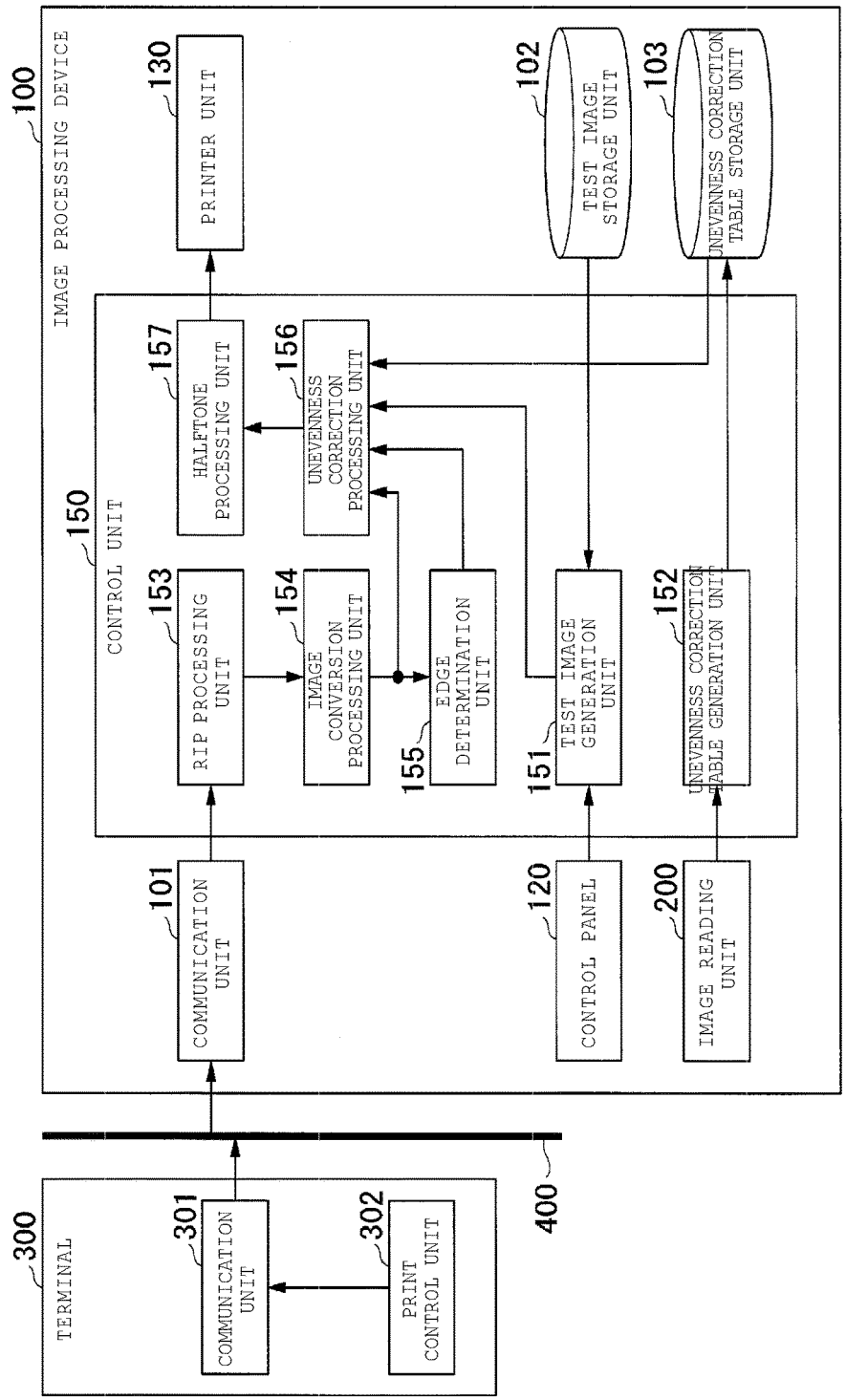
FIG. 2 is a functional block diagram of a system including the image processing device, to illustrate a functional configuration for performing unevenness correction processing according to the embodiment.

FIG. 2 is a functional block diagram of a system including the image processing device 100, to illustrate a functional configuration for performing unevenness correction processing according to the embodiment. The image processing device 100 and a terminal 300 is communicably connected to each other through a network 400. The network 400 may be constructed by any network. For example, the network 400 may be constructed by a local area network (LAN).

The image processing device 100 includes a communication unit 101, a test image storage unit 102, an unevenness correction table storage unit 103, the control panel 120, the printer unit 130, a control unit 150, and the image reading unit 200.

The communication unit 101 is a network interface. The communication unit 101 communicates with the terminal 300 through the network 400. The communication unit 101 may communicate with the terminal through a communication method, such as the local area network (LAN) or the Bluetooth®.

The test image storage unit 102 is implemented by a storage device such as a magnetic hard disk device or a semiconductor memory device. The test image storage unit 102 stores a test image. The test image is an image in which gradation patch images of colors of CMYK, respectively, are arranged in a main scan direction. The test image includes one or more regions partitioned in a sub-scan direction. The gradation patch images are respectively disposed in each region. The gradation patch image is used for adjusting the amount of developing agency adhering to a sheet. The test image is stored in the test image storage unit 102 in advance.

The unevenness correction table storage unit 103 is implemented by a storage device, such as a magnetic hard disk device or a semiconductor memory device. The unevenness correction table storage unit 103 stores an unevenness correction table. The unevenness correction table is used to determine an output value in accordance with gradation characteristics of a region having the smallest read value, among a plurality of regions having the test images. The unevenness correction table is generated by an unevenness correction table generation unit 152. The unevenness correction table is generated for each color of CMYK.

The control unit 150 controls operations of each unit of the image processing device 100. The control unit 150 is implemented by a device including, for example, a central processing unit (CPU) and a random access memory (RAM). The control unit 150 executes an image processing program, thereby, functioning as a test image generation unit 151, the unevenness correction table generation unit 152, a RIP processing unit 153, an image conversion processing unit 154, an edge determination unit 155, an unevenness correction processing unit 156, and a halftone processing unit 157.

The test image generation unit 151 acquires a test image stored in the test image storage unit 102. The test image generation unit 151 generates the test image. The test image generation unit 151 transmits the generated test image to the printer unit 130 and an image is formed.

The unevenness correction table generation unit 152 generates an unevenness correction table on the basis of reading the test image by the image reading unit 200. The unevenness correction table generation unit 152 generates an unevenness correction table in accordance with gradation characteristics of a region having the thinnest solid density. The unevenness correction table generation unit 152 determines an output value of exposure with respect to a photosensitive drum on the basis of an input value. A potential of an electrostatic latent image which is formed in the photosensitive drum is determined in accordance with the output value of exposure. The amount of toner adhering to the sheet depends on the potential. The solid density depends on the amount of toner adhering to the sheet.

The RIP processing unit 153 converts a print job received from the terminal 300 into image data of a raster format. The raster format is an image format to store information of color and density by pixel unit. The RIP processing unit 153 generates attribute information from the image data. The attribute information is image information included in the image data, such as, an image such as a photo, graphics illustrating a figure such as a circle or a triangle, or a text illustrating a charter string. The RIP processing unit 153 outputs the image data and the attribute information to the image conversion processing unit 154. The print job is an image forming command which is given to the image processing device 100. The print job includes the image data of an image.

The image conversion processing unit 154 performs color conversion and filter processing for the image data received from the RIP processing unit 153. The color conversion is, for example, processing of improving reproduction of gradation of the image data. The filter processing is, for example, a smoothing filter or a Gaussian filter. The color conversion and the filter processing may be any method as long as the method is known. The image conversion processing unit 154 outputs the image data to the edge determination unit 155 and the unevenness correction processing unit 156.

The edge determination unit 155 determines whether or not each pixel of the received image data is on an edge. The edge determination unit 155 performs filter calculation for each pixel by using a filter for edge detection. The edge determination unit 155 determines whether the pixel is an edge pixel or a non-edge pixel, based on a result of the filter calculation. The edge determination unit 155 outputs the determined results to the unevenness correction processing unit 156 as edge information. The filter for edge detection is, for example, a Laplacian filter. The filter for edge detection may be any filter, as long as it can be determined whether the pixel is an edge pixel or a non-edge pixel.

The edge determination unit 155 determines that the pixel is an edge pixel, in a case where the pixel included in the image data is a thin line. In a case where a value of a pixel orthogonal to a direction in which the edge pixel extends satisfies a predetermined condition, the edge determination unit 155 determines that the pixel is the thin line. The predetermined condition may include a condition that a difference between two pixel values orthogonal to each other is within a predetermined range.

The unevenness correction processing unit 156 determines whether or not to perform unevenness correction processing for each pixel of the image data on the basis of the received edge information. The unevenness correction processing unit 156 acquires the edge information of a target pixel. In a case where the edge information is a non-edge pixel, the unevenness correction processing unit 156 sets a value obtained by performing unevenness correction processing for an input value as an output value. In a case where the edge information is an edge pixel, the unevenness correction processing unit 156 may set a value close to the input value as the output value with respect to the edge pixel. The value close to the input value may be, for example, a value or the like larger than the input value by 1. The target pixel is a pixel with respect to which whether or not unevenness correction processing is performed is determined.

The unevenness correction processing is processing of correcting an input value with respect to the output value on the basis of the unevenness correction table. The unevenness correction processing unit 156 determines a region of the unevenness correction table, according to a coordinate value in the main scan direction. The unevenness correction processing unit 156 determines an output value of the unevenness correction table, based on the determined region and the input value.

The halftone processing unit 157 converts image data for which unevenness correction has been performed into image data which can be printed by the printer unit 130. The halftone processing unit 157 expresses multiple gradations by combining a plurality of pixel values with a predetermined gradation. The halftone processing unit 157 converts the image data by using, for example, an error diffusion method, a dither method, or a density pattern method.

The terminal 300 is implemented by an information processing device, such as a mainframe, a workstation or a personal computer. The terminal 300 includes a CPU, a memory, an auxiliary storage device, and the like which are connected to each other through a bus. The terminal 300 functions as a device including a communication unit 301 and a print control unit 302 by executing a print data generation program. All or a part of each function of the terminal 300 may be implemented by using hardware such as an ASIC, a PLD, or an FPGA. The print data generation program may be recorded in a non-transitory computer-readable recording medium. The non-transitory computer-readable recording medium is a portable medium, such as a flexible disk, a magneto-optical disk, a ROM, a CD-ROM, and a semiconductor memory device (for example, SSD), and a storage device such as a hard disk or a semiconductor memory device which is embedded in a computer system.

The communication unit 301 is a network interface. The communication unit 301 communicates with the image processing device 100. The communication unit 301 may communicates with the image processing device through a communication method, such as the LAN or the Bluetooth®. The print control unit 302 transmits the print job to the image processing device 100 in accordance with an operation of a user. The print control unit 302 is, for example, a printer driver.

Figure 3:
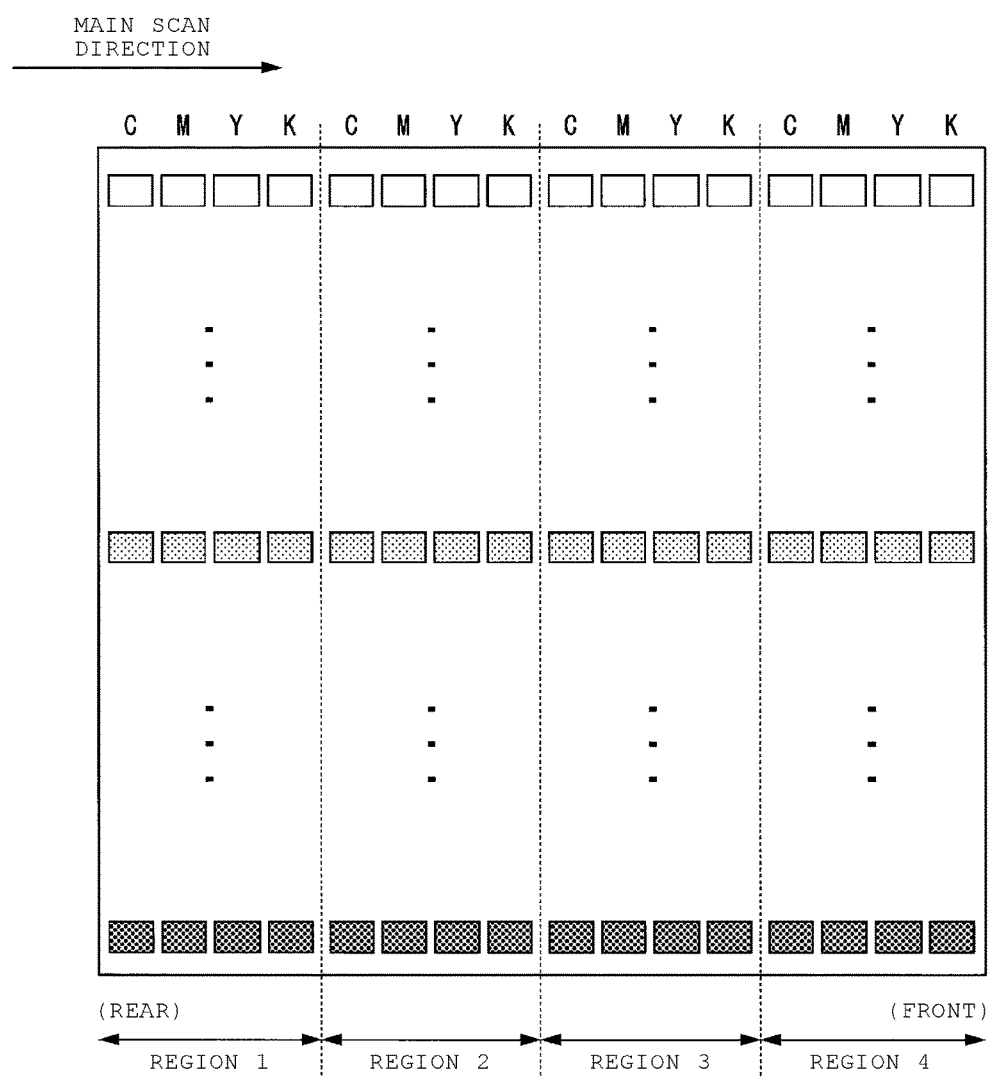
FIG. 3 illustrates an example of a test image in which gradation patch images are disposed in four regions, according to the embodiment.

FIG. 3 illustrates one specific example of the test image in which gradation patch images are disposed in four regions, according to the embodiment. The more the gradation patch image is disposed in a sub-scan direction, the larger the pixel value is. In a case of FIG. 3, the number of regions included in the test image is four, but the number of regions included in the test image is not limited to four. For example, the number of regions may be five. Hereinafter, the number of regions will be described as four.

FIG. 4 illustrates one specific example of the unevenness correction table according to the embodiment. The unevenness correction table has unevenness correction codes. The unevenness correction code includes values of an input value and an output value for each region. The region indicates a region that the test image includes. The input value indicates a pixel value of input image data of the unevenness correction processing unit 156. The output value indicates an output value of the unevenness correction processing unit 156 in a case where the unevenness correction processing is performed for the input value. The solid density indicates a density of color in a state where toner adheres to a sheet. The unevenness correction tables are respectively generated for each color of CMYK.

In FIG. 4, record of a top stage of the unevenness correction table shows that an input value of a region 1 is "0", an output value of the region 1 is "0", an input value of a region 2 is "0", an output value of the region 2 is "0", an input value of a region 3 is "0", an output value of the region 3 is "0", an input value of a region 4 is "0", and an output value of the region 4 is "0". Hence, according to the record of the top stage of unevenness correction table, an image is formed such that, in a case where an input value of the read image data is all zero, an output value is all zero. The unevenness correction table illustrated in FIG. 4 is only one specific example. Accordingly, the unevenness correction table may be configured by an aspect different from FIG. 4. For example, the unevenness correction table may illustrate all colors of CMYK in one table.

Figure 5:
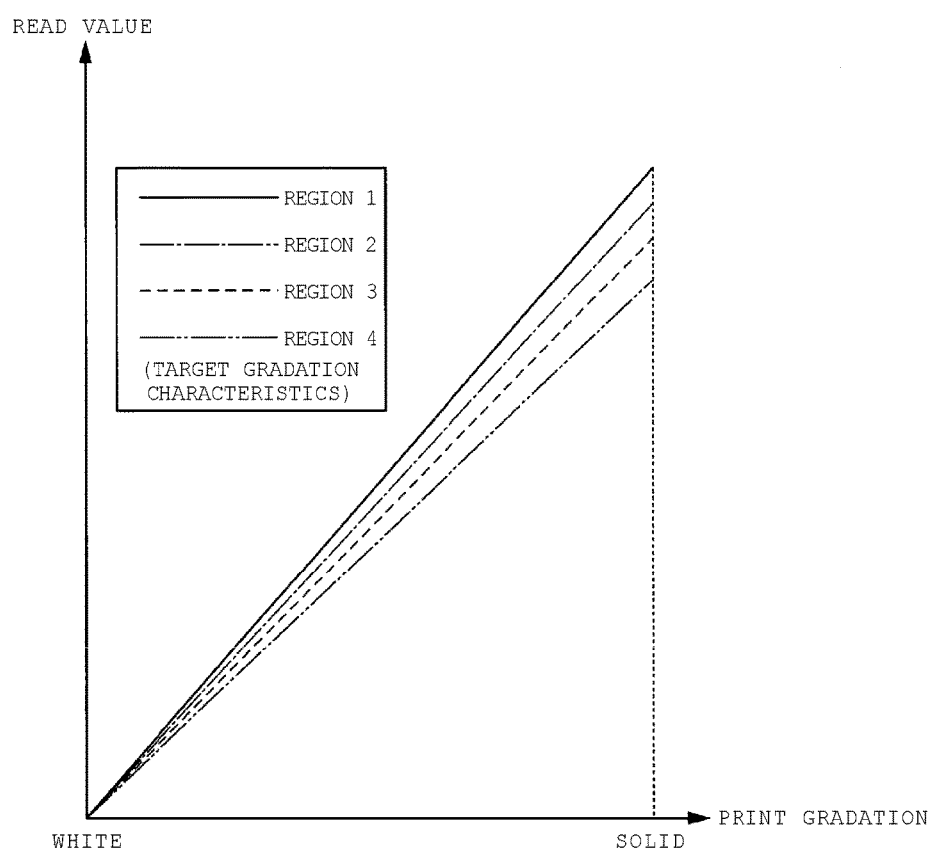
FIG. 5 is a graph illustrating an example of gradation characteristics for each region of the read test image, according to the embodiment.

FIG. 5 is a graph illustrating one specific example of gradation characteristics for each region of the read test image, according to the embodiment. A vertical axis is a read value which is calculated when the test image is read. The unevenness correction table generation unit 152 calculates the unevenness correction table based on the read value. The unevenness correction table generation unit 152 sets the gradation characteristics of a region in which a solid read value is the smallest as target gradation characteristics. In FIG. 5, it is assumed that the unevenness correction table generation unit 152 sets the region 4 as the target gradation characteristics. The target gradation characteristics are target values of output values of other regions. The output value is generated to be close to the target gradation characteristics, when the unevenness correction table is generated.

Figure 6:
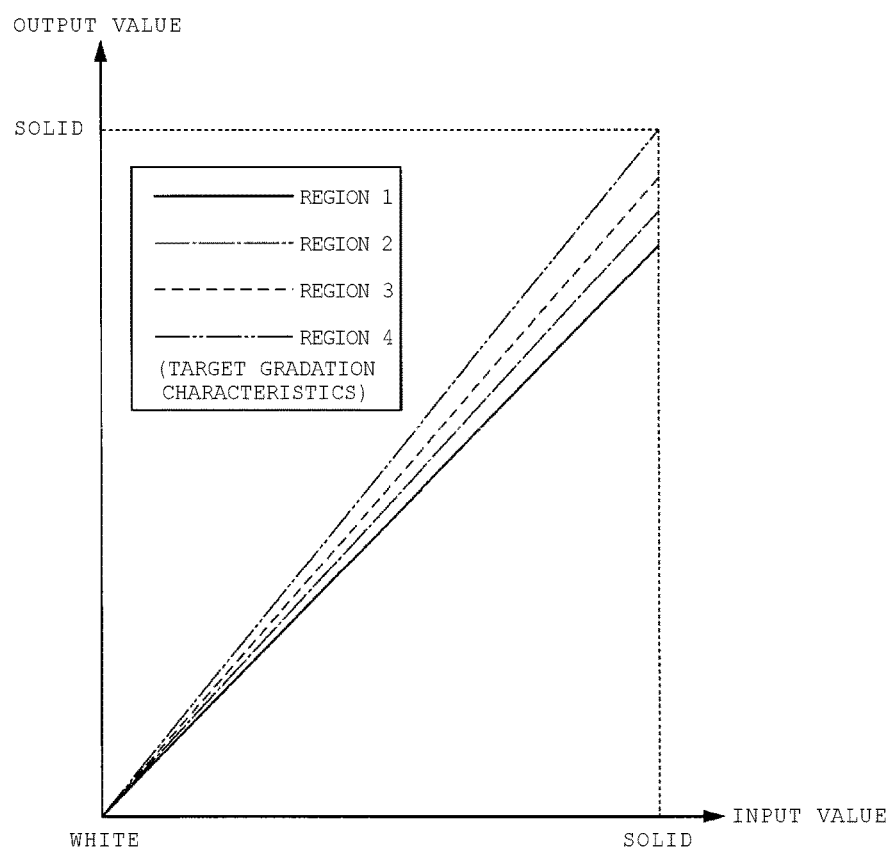
FIG. 6 is a graph corresponding to the unevenness correction table in a case where the gradation characteristics of FIG. 5 are obtained, according to the embodiment.

FIG. 6 is a graph corresponding to the unevenness correction table in a case where the gradation characteristics of FIG. 5 are obtained, according to the embodiment. In the region 4 with the smallest solid read value, the input value is equal to the output value. Hence, the region 4 is linearly represented. The other regions are represented in a curved shape such that the output value with respect to the input value approaches the region 4. Thereby, all regions approach the region 4, and thus, unevenness of density at the time of forming an image is eliminated.

Figure 7:
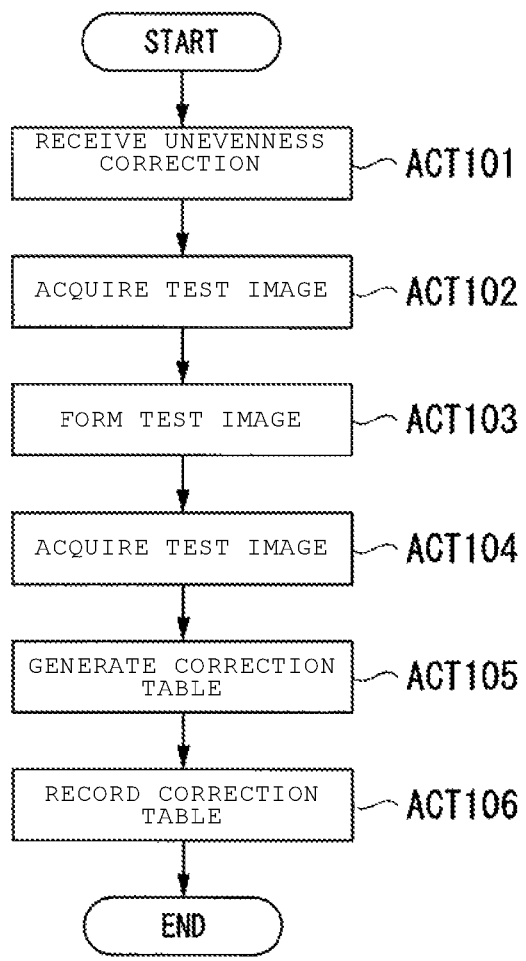
FIG. 7 is a flowchart illustrating a flow of unevenness correction table creation processing according to the embodiment.

FIG. 7 is a flowchart illustrating a flow of unevenness correction table creation processing according to the embodiment. The control panel 120 receives instruction of unevenness correction processing from a user (ACT 101). The test image generation unit 151 acquires the test image from the test image storage unit 102 (ACT 102). The test image generation unit 151 outputs data of the test image to the printer unit 130. The printer unit 130 forms the test image (ACT 103).

The image reading unit 200 read the test image (ACT 104). The unevenness correction table generation unit 152 generates the unevenness correction table, based on image data of the read test image (ACT 105). The unevenness correction table generation unit 152 stores the unevenness correction table in the unevenness correction table storage unit 103 (ACT 106).

Figure 8:
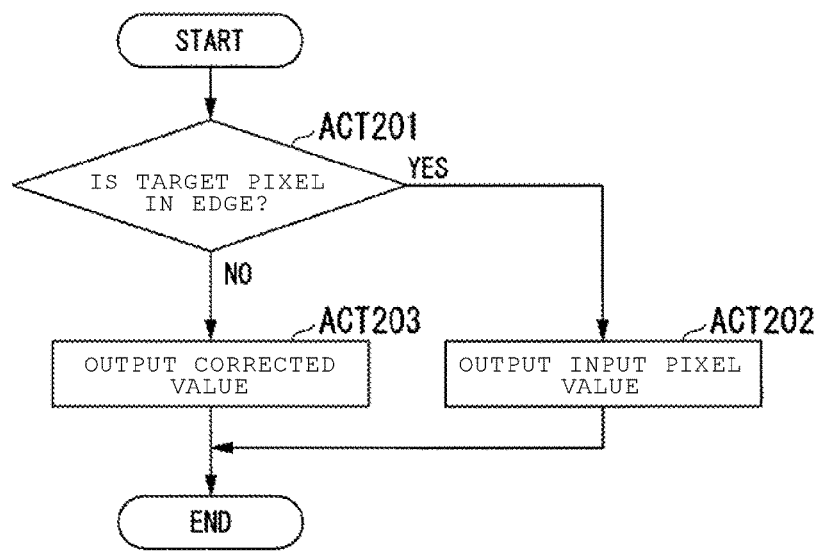
FIG. 8 is a flowchart illustrating a flow of unevenness correction processing for a target pixel, according to the embodiment.

FIG. 8 is a flowchart illustrating a flow of unevenness correction processing for the target pixel, according to the embodiment. The unevenness correction processing unit 156 determines whether or not the target pixel of the image data is on an edge, based on the edge information (ACT 201). In a case where the target pixel is not on an edge (ACT 201: NO), the unevenness correction processing unit 156 sets a value which is obtained by performing the unevenness correction processing for an input value as an output value (ACT 202). In a case where the target pixel is on an edge (ACT 201: YES), the unevenness correction processing unit 156 outputs the input value as the output value as it is (ACT 203).

Figure 9:
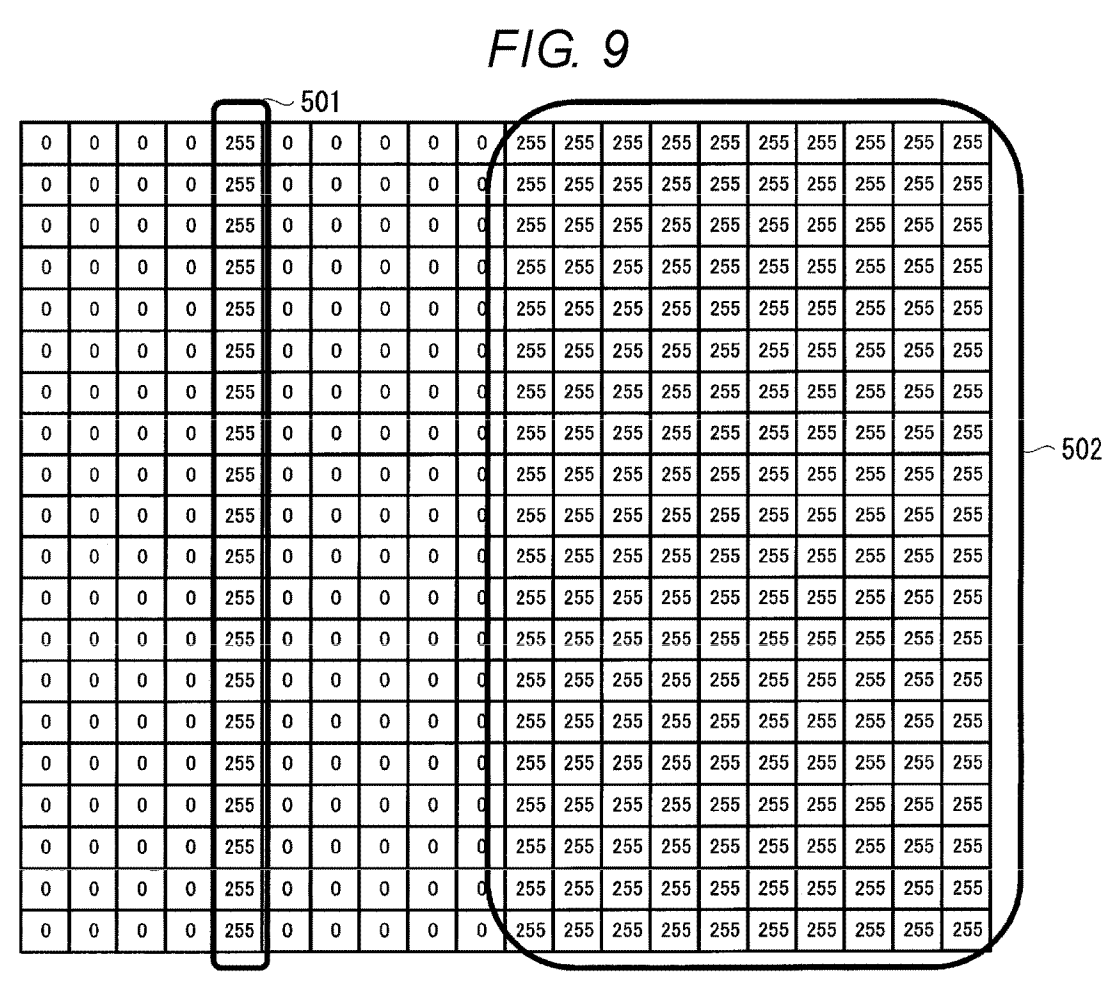

FIG. 9 illustrates one specific example of the input image prior to the unevenness correction processing. Attribute of the image data of FIG. 9 is graphics. A region 501 is a thin line which is configured by one pixel width. A region 502 is a pattern with an area.

Figure 10:
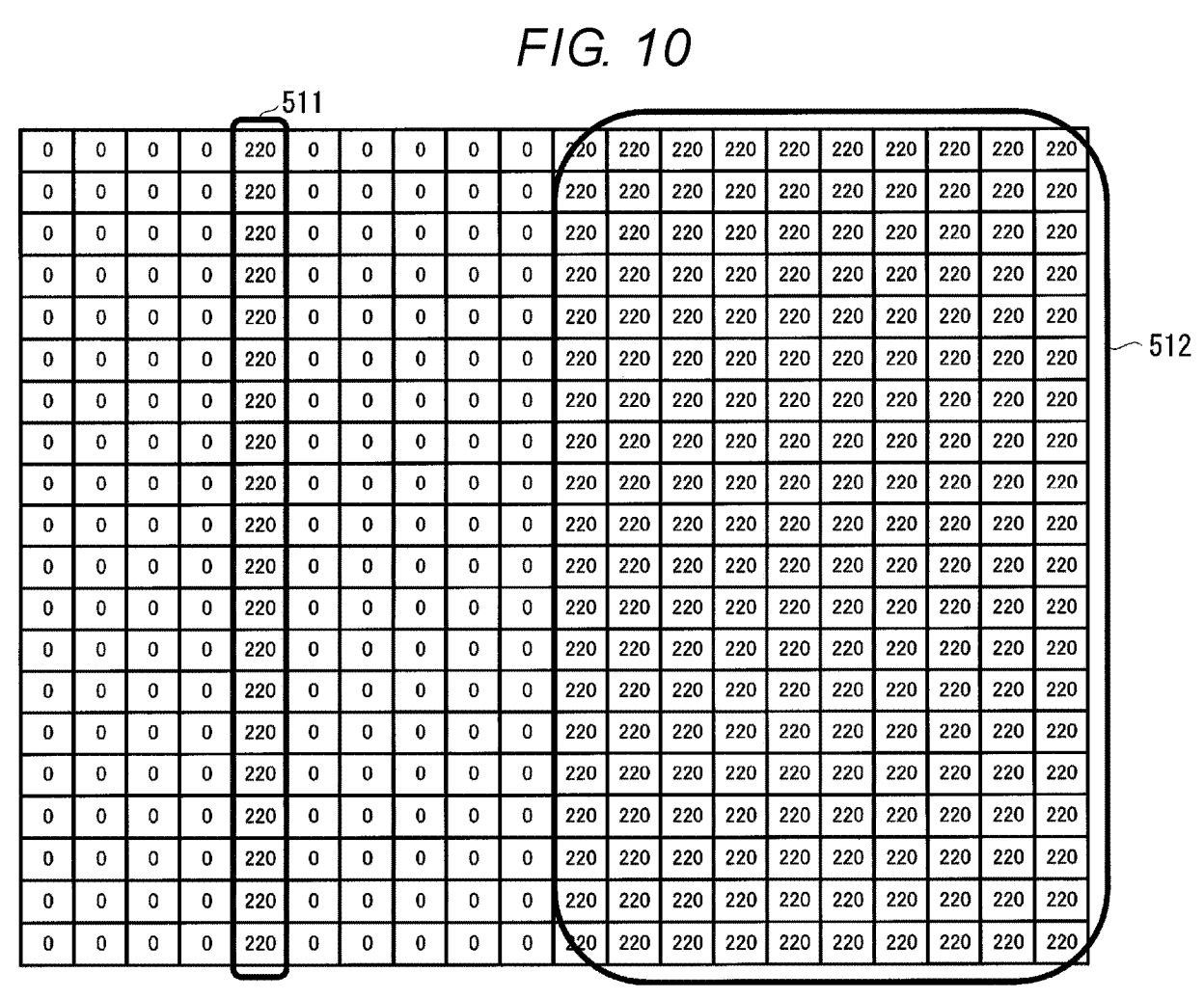

FIG. 10 illustrates one specific example of results after the unevenness correction processing of the related art. FIG. 10 illustrates results of a case where the unevenness correction table in which the output value becomes 220 with respect to the input value of 255 is applied. A region 511 is a thin line. A region 512 is a pattern with an area. The region 511 and the region 512 all have input values of 255, and thereby, the output values become 220.

Figure 11:
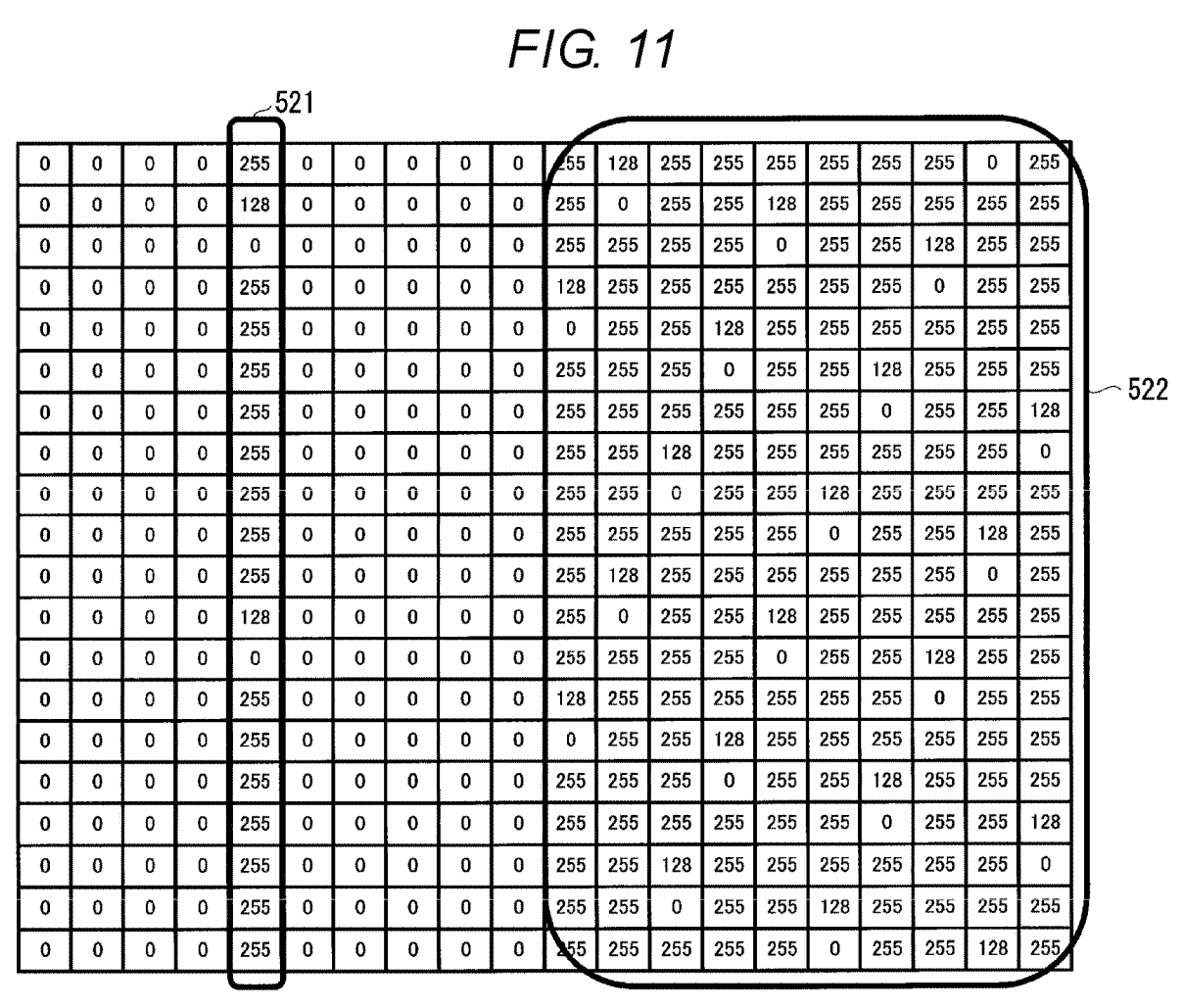

FIG. 11 illustrates one specific example of results after halftone processing of the related art. A region 521 is a thin line. A region 522 is a pattern with an area. The output value is reduced by unevenness correction, and thereby, a screen lies over the thin line. Hence, if the halftone processing is performed, degradation of image quality occurs in which the thin line is cut.

Figure 12:
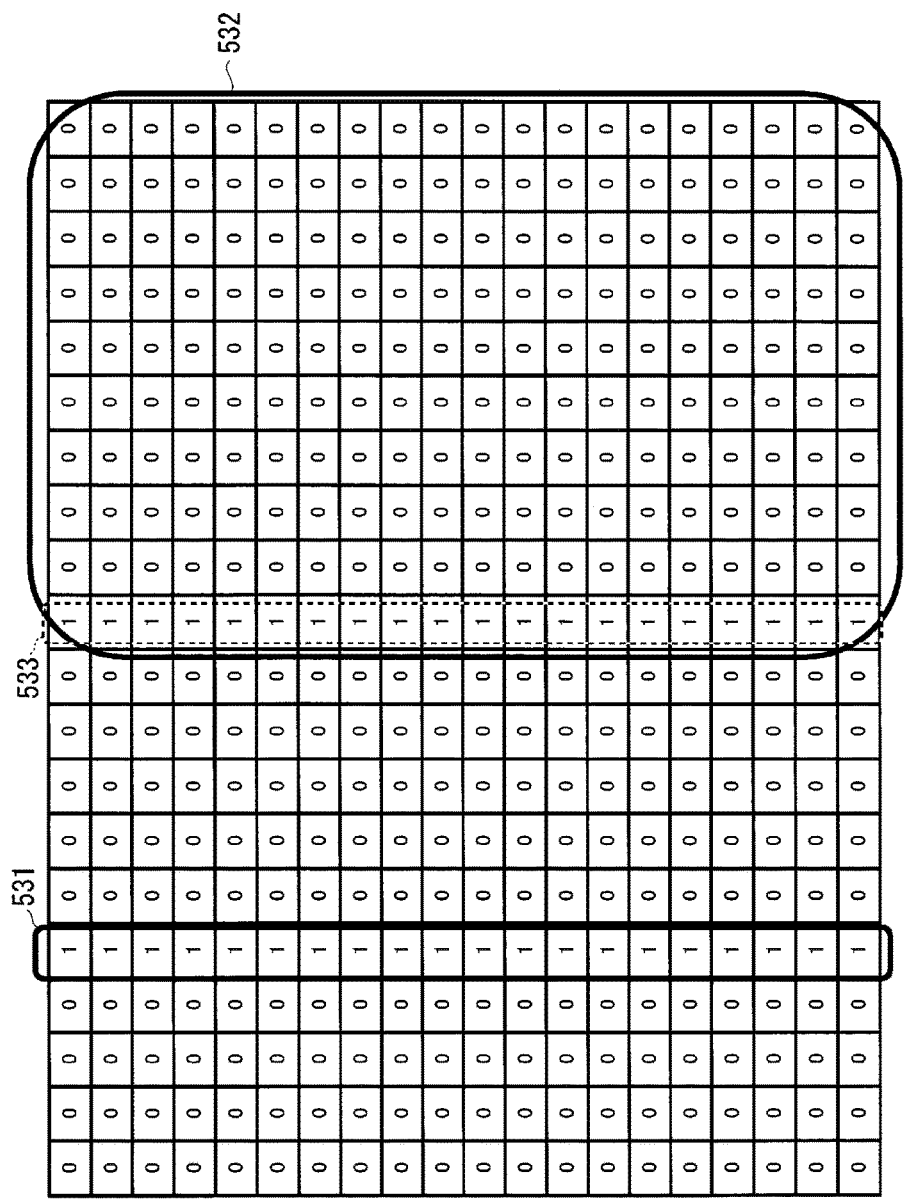
FIG. 12 illustrates an example of edge information, according to the embodiment.

FIG. 12 illustrates one specific example of the edge information, according to the embodiment. A region 531 is an edge portion of a thin line. A region 532 is a pattern with an area. A region 533 is an edge portion of a pattern with an area.

Figure 13:
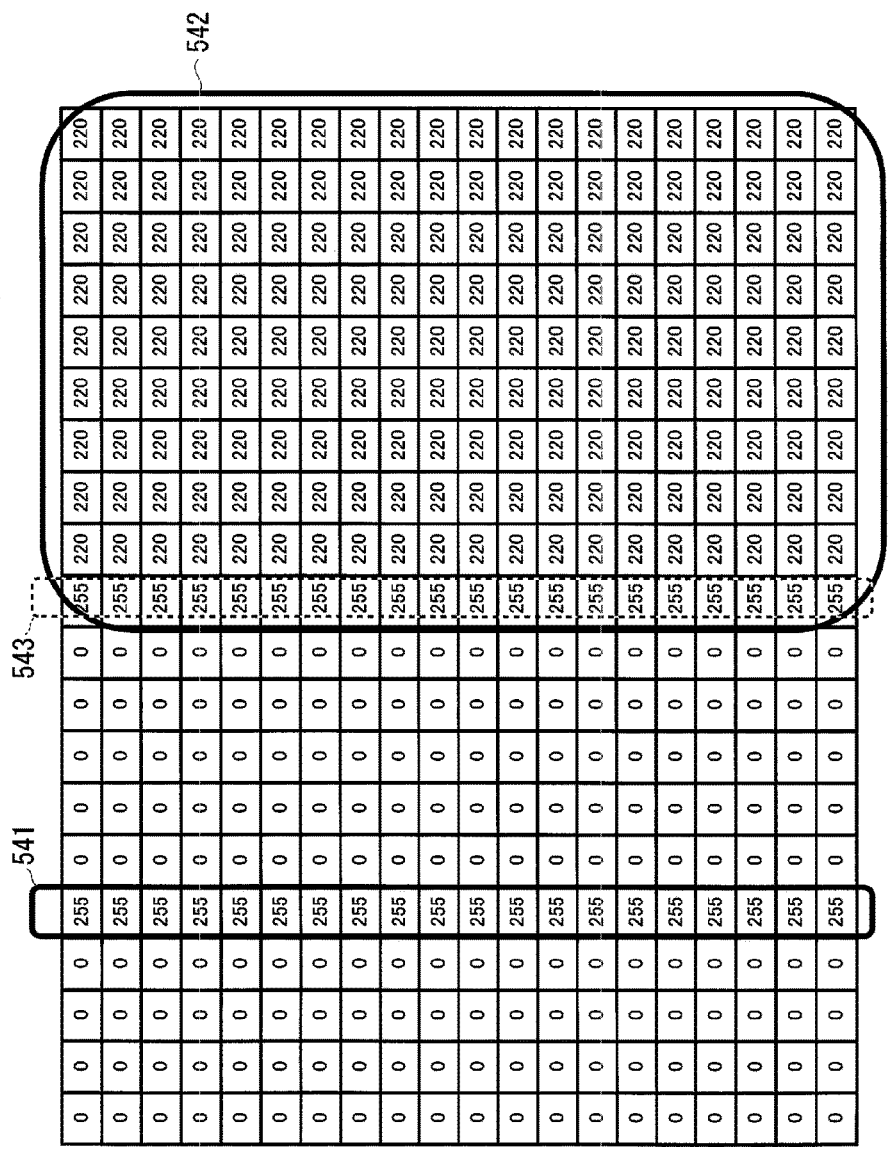
FIG. 13 illustrates an example of an image resulting after the unevenness correction processing based on the edge information, according to the embodiment.

FIG. 13 illustrates one specific example of results of the unevenness correction processing based on the edge information, according to the embodiment. A region 541 is denoted by a thin line. A region 542 is denoted by a pattern with an area. A region 543 is denoted by an edge portion of a pattern with an area. In the embodiment, since the region of the thin line is an edge pixel, an original pixel value is maintained.

Figure 14:
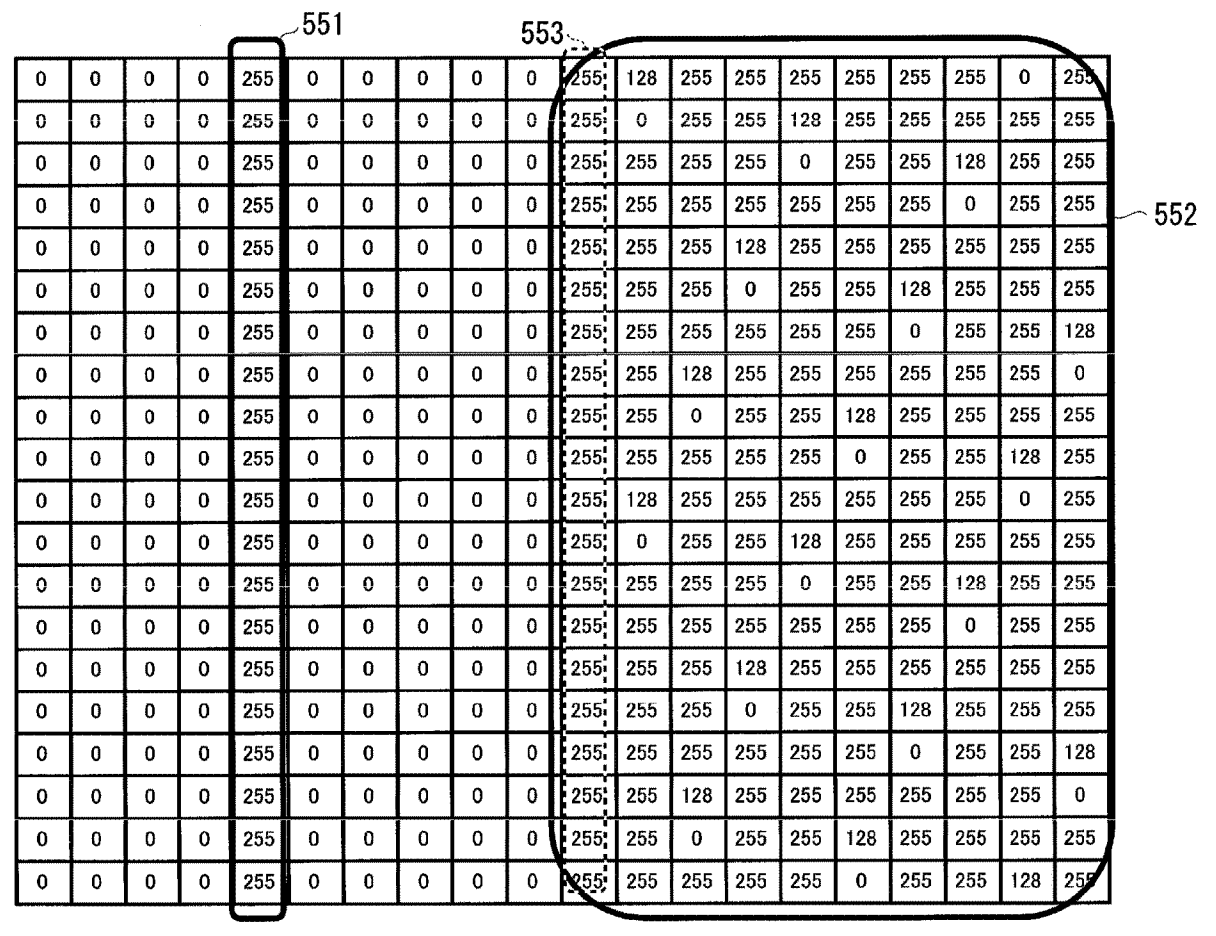

FIG. 14 illustrates one specific example of results after the halftone processing according to the embodiment. A region 551 is denoted by a thin line. A region 552 is denoted by a pattern with an area. A region 553 is denoted by an edge portion of a pattern with an area. In the embodiment, since the region of the thin line is the edge pixel, the unevenness correction processing is not performed. Accordingly, an original pixel value is maintained in the region of the thin line, and cutting of the thin line does not occur.

By providing the above configurations, the unevenness correction processing unit 156 does not perform the unevenness correction for the edge pixel, and performs the unevenness correction for the non-edge pixel. Accordingly, the unevenness correction processing unit 156 can perform correction processing by a pixel unit regardless of attribute information. Hence, unevenness of print density can be eliminated and image quality can be prevented from being degraded by performing unevenness correction for a portion where unevenness correction is not required.

According to at least one embodiment described above, image quality can be prevented from being degraded due to unevenness of print density by including the unevenness correction processing unit 156.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a printing device;
a storage device, in which unevenness correction data indicating a corrected pixel value in association with each input pixel value are stored;
a processor configured to:
determine, among pixels indicated by raster image data of an image to be printed, edge pixels corresponding to an edge image portion and non-edge pixels corresponding to a non-edge image portion;
carry out unevenness correction on the raster image data selectively with respect to the determined non-edge pixels, using the unevenness correction data stored in the storage device;
generate print image data based on the raster image data subjected to the unevenness correction; and
control the printing device to print the image based on the generated print image data.

2. The image forming apparatus according to claim 1, wherein
the processor generates the print image data by carrying out halftone processing on the raster image data subjected to the unevenness correction.

3. The image forming apparatus according to claim 1, wherein
the processor does not carry out the unevenness correction with respect to the determined edge pixels.

4. The image forming apparatus according to claim 1, further comprising:
a scanner, by which the raster image data are obtained as a result of scanning an original image.

5. The image forming apparatus according to claim 4, wherein
the processor is further configured to generate the unevenness correction data based on test image data that is obtained by the scanner scanning a test image that includes a plurality of patch image regions arranged in a main scanning direction and a sub scanning direction, wherein patch image regions aligned in the sub scanning direction are of a same color and different pixel values that are incremental in the sub scanning direction.

6. The image forming apparatus according to claim 1, wherein
the processor determines that pixels that have substantially the same pixel value and extend in a direction are edge pixels when a difference of a pixel value of one of the pixels and a pixel value of a pixel adjacent to the one of the pixels in a main scanning direction or a sub scanning direction is greater than a threshold value.

7. The image forming apparatus according to claim 1, wherein
the unevenness correction data indicate, with respect to each of a plurality of image regions, a unique corrected pixel value in association with each input pixel value.

8. An image processing method comprising:
determining, among pixels indicated by raster image data of an image to be printed, edge pixels corresponding to an edge image portion and non-edge pixels corresponding to a non-edge image portion;
carrying out unevenness correction on the raster image data selectively with respect to the determined non-edge pixels, using unevenness correction data indicating a corrected pixel value in association with each input pixel value; and
generating print image data based on the raster image data subjected to the unevenness correction.

9. The image processing method according to claim 8, wherein
the print image data are generated by carrying out halftone processing on the raster image data subjected to the unevenness correction.

10. The image processing method according to claim 8, wherein
the unevenness correction is not carried out with respect to the determined edge pixels.

11. The image processing method according to claim 8, further comprising:
obtaining the raster image data by scanning an original image by a scanner.

12. The image processing method according to claim 11, further comprising:
generating the unevenness correction data based on test image data that are obtained by the scanner scanning a test image that includes a plurality of patch image regions arranged in a main scanning direction and a sub scanning direction, wherein patch image aligned in the main scanning direction are of a same color and different pixel values that are incremental in the sub scanning direction.

13. The image processing method according to claim 8, wherein
pixels that have substantially the same pixel value and extend in a direction are edge pixels when a difference of a pixel value of one of the pixels and a pixel value of a pixel adjacent to the one of the pixels in a main scanning direction or a sub scanning direction is greater than a threshold value.

14. The image processing method according to claim 8, wherein
the unevenness correction data indicate, with respect each of a plurality of image regions, a unique corrected pixel value in association with each input pixel value.

15. An image processing device comprising a processor configured to:
determine, among pixels indicated by raster image data of an image to be printed, edge pixels corresponding to an edge image portion and non-edge pixels corresponding to a non-edge image portion;
carry out unevenness correction on the raster image data selectively with respect to the determined non-edge pixels, using unevenness correction data indicating a corrected pixel value in association with each input pixel value; and
generate print image data based on the raster image data subjected to the unevenness correction.

16. The image processing device according to claim 15, wherein
the processor generates the print image data by carrying out halftone processing on the raster image data subjected to the unevenness correction.

17. The image processing device according to claim 15, wherein
the unevenness correction is not carried out with respect to the determined edge pixels.

18. The image processing device according to claim 15, further comprising:
a scanner, by which the raster image data are obtained as a result of scanning an original image.

19. The image processing device according to claim 18, wherein
the processor is further configured to generate the unevenness correction data based on test image data that are obtained by the scanner scanning a test image that includes a plurality of patch image regions arranged in a main scanning direction and a sub scanning direction, wherein patch image regions aligned in the sub scanning direction are of a same color and different pixel values that are incremental in the sub scanning direction.

20. The image processing device according to claim 15, wherein
the processor determines that pixels that have substantially the same pixel value and extend in a direction are edge pixels when a difference of a pixel value of one of the pixels and a pixel value of a pixel adjacent to the one of the pixels in a main scanning direction or a sub scanning direction is greater than a threshold value.

* * * * *